(No Model.)

J. HEARNE.
SLIDE VALVE FOR GAS METERS.

No. 404,970. Patented June 11, 1889.

Witnesses:
John Bickel
C. Lundgren

Inventor:
John Hearne,
by his Attorneys
Brown & Griswold

UNITED STATES PATENT OFFICE.

JOHN HEARNE, OF NEW YORK, N. Y., ASSIGNOR TO JOSEPH FLANNERY AND WALTER P. ELLIOTT, BOTH OF SAME PLACE.

SLIDE-VALVE FOR GAS-METERS.

SPECIFICATION forming part of Letters Patent No. 404,970, dated June 11, 1889.

Application filed April 8, 1889. Serial No. 306,305. (No model.)

*To all whom it may concern:*

Be it known that I, JOHN HEARNE, of the city, county, and State of New York, have invented a new and useful Improvement in Gas-Meters, of which the following is a specification, reference being had to the accompanying drawings.

My invention relates particularly to the valves employed in gas-meters, and especially to that class of valves known as "slide-valves." Heretofore slide-valves of gas-meters have been liable to injury owing to the lack of protection therefor, and it is the object of my improvement to avoid this. In order to accomplish this result, I combine with a sliding valve a guard for preventing the disarrangement of the valve, which guard is arranged near to but normally out of contact with the valve.

Figure 1:
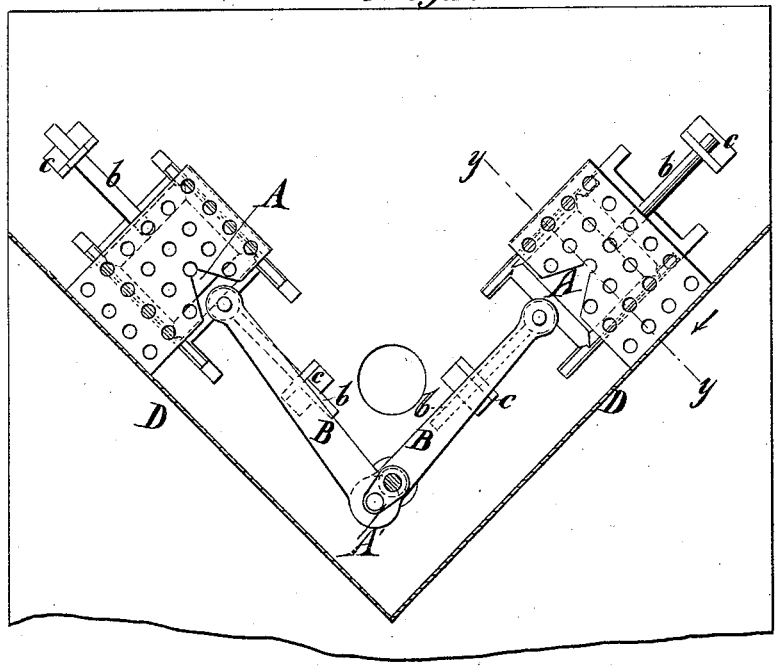
Figure 2:
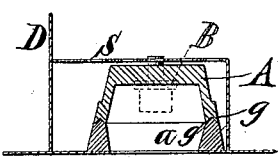

In the accompanying drawings, Figure 1 is a plan view showing slide-valves embodying my improvement in a two-diaphragm gas-meter. Fig. 2 is a transverse section of the same, taken on the plane of the line $y\ y$, Fig. 1, and looking in the direction of the arrow.

Similar letters of reference designate corresponding parts in all the figures.

In illustrating my improvement I have omitted the diaphragm mechanism, for the same does not constitute, broadly, a part of my invention. I have shown my invention in the examples thereof illustrated in Figs. 1 and 2 as applied to a two-diaphragm meter. The valves comprise slides A, adapted to alternately open and close gas-passages $a$. The slides A are adapted to be reciprocated above the gas-passages $a$ in such manner as to alternately open and close said gas-passages. Of course it is understood that they fit snugly on their seats. As shown, they are provided with V-shaped portions $g$ upon their under sides, fitting V-ways on the valve-seats $g'$.

I have shown a crank A', with which are combined crank-arms B in a well-known manner, which crank-arms are connected to the slides A. When the crank is rotated, it will be quite apparent that the slides A will be reciprocated to and fro in opposite directions alternately.

I have shown guide-rods $b$ for the slides A, which guide-rods are adapted to be reciprocated to and fro through suitably-formed apertures in standards $c$, secured upon the bottom plate of the valve-chamber. These valve-rods may be constructed of soft metal, and it will be readily seen that any violent jarring of the meter and many other causes will operate to throw the slides A from their seats, and as a consequence there is an escape of gas about the valves. To overcome this, I place a shield or guard S about the slides A. The guards, as shown, consist of perforated strips of sheet metal extending over and about the valves. The guards do not contact with the valves when the latter are in normal position on their seats, but lie sufficiently near thereto to prevent any permanent displacement of the valves when from any cause the valve is unseated. It is not wholly essential, however, that the guards should be perforated, and when perforated they need only be perforated above the valves. The form of guards here illustrated are secured near one end to a vertically-extending piece of metal D, comprised in the wall of the valve-box, and are bent downwardly at the sides of the valves and are secured at their lower ends to the bottom plate of the valve-box.

I have shown the ends of the guards adjacent to the crank-arms B as notched, so as to admit of the reciprocation of the crank-rods for a short distance within said guards.

The construction is such that it is not wholly essential to employ the guide-rods $b$, as I have shown means whereby an accurate reciprocation of the slides A may be secured independently of such guide-rods.

The object of providing the example of the guard shown with openings above the valve is to enable an instrument to be inserted for the purpose of tapping the valve to see that it is firmly seated.

It will be seen that by my improvement I provide a means whereby the accidental or intentional displacement of the valve-slide from its seat is prevented, and whereby the leakage of gas owing to such displacement is avoided.

What I claim as my invention, and desire to secure by Letters Patent, is—

1. In a meter, the combination, with a slide-valve, of a guard for preventing the permanent displacement of the valve, the said guard being near to but normally out of contact with the said valve, substantially as specified.

2. In a meter, the combination, with a slide-valve and a soft-metal guide therefor, of a guard to prevent the permanent displacement of the valve, the said guard being near to and normally out of contact with the valve, substantially as set forth.

JOHN HEARNE.

Witnesses:
FREDK. HAYNES,
ARTHUR H. GAMBLIN.